US010059863B2

(12) United States Patent
Roock et al.

(10) Patent No.: US 10,059,863 B2
(45) Date of Patent: *Aug. 28, 2018

(54) STRUCTURAL POLYURETHANE ADHESIVE

(71) Applicant: SIKA TECHNOLOGY AG, Baar (CH)

(72) Inventors: Wolfgang Roock, Appen (DE); Steffen Kelch, Oberengstringen (CH); Florian Ittrich, Pinneberg (DE); Martin Linnenbrink, Apensen (DE)

(73) Assignee: GALDERMA RESEARCH & DEVELOPMENT, Biot (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/413,371

(22) PCT Filed: Aug. 26, 2013

(86) PCT No.: PCT/EP2013/067628
§ 371 (c)(1),
(2) Date: Jan. 7, 2015

(87) PCT Pub. No.: WO2014/029891
PCT Pub. Date: Feb. 27, 2014

(65) Prior Publication Data
US 2015/0159064 A1 Jun. 11, 2015

(30) Foreign Application Priority Data
Aug. 24, 2012 (EP) .................................. 12181774

(51) Int. Cl.
| C09J 175/12 | (2006.01) |
| C09J 175/08 | (2006.01) |
| C09J 175/04 | (2006.01) |
| B32B 37/18 | (2006.01) |
| B32B 7/12 | (2006.01) |
| B32B 37/12 | (2006.01) |
| C08G 18/76 | (2006.01) |
| C08G 18/78 | (2006.01) |
| C08G 18/72 | (2006.01) |
| C08G 18/10 | (2006.01) |
| C08G 18/12 | (2006.01) |
| C08G 18/32 | (2006.01) |
| C08G 18/65 | (2006.01) |
| C08G 18/66 | (2006.01) |
| C09J 179/08 | (2006.01) |

(52) U.S. Cl.
CPC .............. C09J 175/12 (2013.01); B32B 7/12 (2013.01); B32B 37/1284 (2013.01); B32B 37/18 (2013.01); C08G 18/10 (2013.01); C08G 18/12 (2013.01); C08G 18/3206 (2013.01); C08G 18/3225 (2013.01); C08G 18/725 (2013.01); C08G 18/7664 (2013.01); C08G 18/7671 (2013.01); C08G 18/7843 (2013.01); C09J 175/04 (2013.01); C09J 175/08 (2013.01); C09J 179/08 (2013.01); Y10T 428/31551 (2015.04)

(58) Field of Classification Search
CPC .... C08G 18/10; C08G 18/12; C08G 18/3225; C08G 18/3206; C08G 18/6529; C08G 18/6685; C08G 18/725; C08G 18/7664; C08G 18/7671; C08G 18/7843; C08G 18/65; C08G 18/66; Y10T 428/31551; C09J 175/12; C09J 175/04; C09J 175/08; B32B 37/18; B32B 37/1284; B32B 7/12
See application file for complete search history.

(56) References Cited

U.S. PATENT DOCUMENTS

| 5,164,473 | A | * | 11/1992 | Dormish | ................ C08G 18/10 521/137 |
| 5,254,199 | A | * | 10/1993 | Stepanski | .............. C08G 18/10 156/307.3 |
| 9,637,668 | B2 | * | 5/2017 | Burckhardt | ............ C08G 18/12 |
| 2004/0138402 | A1 | | 7/2004 | Thiele et al. | |
| 2009/0214873 | A1 | * | 8/2009 | Demmig | ............ C08G 18/3215 428/423.1 |

FOREIGN PATENT DOCUMENTS

| CN | 101151290 A | 3/2008 |
| EP | 0504681 A1 | 9/1992 |
| EP | 1690880 A1 | 8/2006 |
| JP | 03-031385 A | 12/1991 |
| JP | 2008-530294 A | 8/2008 |
| JP | 2008-308687 A | 12/2008 |
| JP | 2010-534741 A | 11/2010 |
| WO | 2012084937 A1 | 6/2012 |

OTHER PUBLICATIONS

English Translation of International Preliminary Report on Patentability dated Feb. 24, 2015 corresponding to International Patent Application No. PCT/EP2013/067628, 7 pages.
English Translation of International Search Report dated Jan. 2, 2014 corresponding to International Patent Application No. PCT/EP2013/067628, 2 pages.
Office Action and English translation of Office Action, dated Oct. 24, 2017 corresponding to Japanese Patent Application No. 2015-527940, 4 pages.
Chinese Office Action and English Translation of Chinese Office action dated Jul. 28, 2016 corresponding to Chinese Patent Application No. 201380037684.6, 16 pages.
Office Action and English translation of Office Action, dated Jul. 11, 2017 corresponding to Japanese Patent Application No. 2015-527940, 6 pages.

(Continued)

Primary Examiner — Rabon Sergent
(74) Attorney, Agent, or Firm — Dentons US LLP

(57) ABSTRACT

A two-component polyurethane adhesive is described having high strength and extensibility, wherein the mechanical properties are only slightly dependent on the temperature. The polyurethane adhesive can be suitable as a structural adhesive. The adhesive can include a triol, a diol, a polyamine, a polyisocyanate, and a polyurethane polymer having isocayanate groups in certain ratios.

16 Claims, No Drawings

(56) References Cited

OTHER PUBLICATIONS

Office Action dated Dec. 13, 2016 corresponding to European Patent Application No. 13756086.8, 5 pages.
English-language translation of Office Action dated Dec. 13, 2016 corresponding to European Patent Application No. 13756086.8, 4 pages.

* cited by examiner

STRUCTURAL POLYURETHANE ADHESIVE

CROSS-REFERENCE TO PRIOR APPLICATIONS

This application is a National Stage of PCT/EP2013/067628, filed Aug. 26, 2013, and designating the United States (published on Feb. 27, 2014, as WO 2014/029891A1), which claims priority under 35 U.S.C. § 119 to European Patent Application No. 12181774.6, filed Aug. 24, 2012, each hereby expressly incorporated by reference in its entirety and each assigned to the assignee hereof.

Technical Field

The invention relates to the field of two-component polyurethane adhesives, in particular structural polyurethane adhesives.

Prior Art

Two-component polyurethane compositions based on polyols and polyisocyanates have long been used as elastic adhesives. They cure quickly after mixing and can therefore absorb and transmit forces after a short time.

Structural adhesives, also called construction adhesives and assembly adhesives, are used in the manufacturing industry to bond components together in such a way that the adhesive bond is part of a permanently resilient construction. Such adhesives are typically viscoelastic and must meet high demands in terms of workability, strength and adhesion forces.

For many bonded constructs, it is important that over the entire range of its operating temperature, especially in the temperature range of about −35° C. to about +85° C., the adhesive should have a uniform strength insofar as possible, for example, a uniform modulus of elasticity insofar as possible, so that the mechanical behavior of the adhesive bond suitably may be incorporated into the calculation of the construct. Desired are in particular viscoelastic adhesives of high strength and high extensibility wherein the mechanical properties are only slightly dependent on the temperature. These adhesives should be easily processed, usable even at higher layer thicknesses up to 10 millimeters and more, curable to the final strength without problems both at ambient temperature and in a curing process accelerated by heat, and show excellent bonding to metallic and non-metallic substrates.

Disclosure of the Invention

Object of the present invention is therefore to provide a polyurethane adhesive having high strength and high extensibility wherein the mechanical properties are only slightly dependent on the temperature, with said polyurethane adhesive being ideally suitable as a structural adhesive.

It has surprisingly been found that a polyurethane adhesive according to claim 1 achieves this object. Due to its specific composition, the adhesive has good workability with high stability after mixing the components, a good initial adhesive, strength, quick and trouble-free curing and a very high strength in the cured state without losing any of its extensibility and elasticity. The achieved combination of strength and elongation across a range of application of −35° C. to 85° C. is associated with an increased impact strength of the cured material. It was also found that using the polyurethane adhesive according to the invention achieves a particularly good adhesion to metallic surfaces and non-metallic materials, in particular fiber-reinforced composites such as fiberglass-reinforced plastics and carbon fiber-reinforced plastics.

Further aspects of the invention are the subject of further independent claims. Particularly preferred embodiments of the invention are subject of the dependent claims.

Ways of Carrying Out the Invention

Subject of the invention is a polyurethane adhesive consisting of a first and a second component, wherein
said first component contains
   a) at least one triol A1 having a molecular weight in the range of 1,000 to 10,000 g/mol,
   b) at least one diol A2 having two primary hydroxyl groups and a molecular weight in the range of 60 to 150 g/mol, and
   c) at least one aliphatic polyamine A3 with a molecular weight in the range of 60 to 200 g/mol; and
said second component contains
   d) at least one polyisocyanate B1 and
   e) at least one polyurethane polyiner B2 having isocyanate groups;
wherein said triol A1, said diol A2 and the polyamine A3 are present in such an amount that
   the ratio V1 of the number OH groups and $NH_2$ groups of (A2+A3)/A1 is in the range of 4 to 10, and
   g) the ratio V2 of the number of OH groups and $NH_2$ groups of A2/A3 is in the range of 4 to 20.

In the present document, the prefix "poly" in substance names such as "polyol", "polyisocyanate", "polyether" or "polyamine" refers to the fact that the respective substance formally contains more than one functional group present in its name per molecule. In the present document, "molecular weight" in the case of polymers always refers to the mean molecular weight.

A "primary hydroxyl group" denotes an OH group which is bonded to a carbon atom having two hydrogens.

In this document, the term "phase separation" describes the process of separation of highly ordered ("crystalline") regions, also called "hard segments", and poorly ordered ("amorphous") regions, also called "soft segments", during the curing of the polyurethane adhesive.

In this document, "open time" refers to the time within which the parts to be bonded must be joined together after the components are mixed.

In the present document, the term "strength" refers to the strength of the cured adhesive, wherein strength in particular means the tensile strength and the modulus of elasticity (Young's modulus) in the elongation range up to 10%.

In the present document, "room temperature" refers to a temperature of 23° C.

The term "storage-stable" refers to the property of a composition that it can be stored in a suitable container for several weeks to several months at room temperature without undergoing significant changes in its application or use properties due to storage.

Suitable triols A1 are in particular polyoxyalkylenetriols, also called polyether triols. These are polymer products of ethylene oxide, 1,2-propylene oxide, 1,2- or 2,3-butylene oxide or mixtures thereof. Typically, they are polymerized using a starter molecule having three active hydrogen atoms, such as glycerol, 1,1,1-trimethylolethane, 1,1,1-trimethylpropane or mixtures thereof.

Preferred triols A1 are polyoxypropylene triols, polyoxyethylene triols and polyoxypropylene-polyoxyethylene triols.

Particularly preferably, triol A1 has primary hydroxyl groups. In this way, the polyurethane adhesive is less susceptible to undesired reactions of isocyanate groups with any water present, which can lead to the formation of bubbles and incomplete curing.

Particularly preferred triols A1 are so-called "EO-endcapped" (ethylene oxide -endcapped) polyoxypropylene triols. The latter are special polyoxypropylene-polyoxyethylene triols which are obtained, for example, in that pure polyoxypropylene triols are alkoxylated further with ethylene oxide following the completion of the polypropoxylation, and therefore have primary hydroxyl groups.

Preferably, triol A1 has a mean OH functionality in the range from 2.2 to 3. Using such triols A1, adhesives with good mechanical properties are obtained.

Preferably, triol A1 has a molecular weight in the range from 3,000 to 8,000 g/mol, particularly preferably from 4,000 to 6000 g/mol. Such a triol is particularly beneficial for an adhesive with good mechanical properties.

The triol A1 is preferably used in an amount of 30 to 70% by weight based on the total weight of the first component.

Suitable diols A2 are in particular 1,2-ethanediol, 1,3-propanediol, 1,4-butanediol, 1,5-pentanediol, 1,6-hexanediol, 1,3-cyclohexanedimethanol, 1,4-cyclohexanedimethanol and diethylene glycol. These diols have primary hydroxyl groups that are hardly sterically hindered and which are particularly reactive with isocyanate groups.

Preferably, diol A2 is a linear diol, in particular selected from the group consisting of 1,3-propanediol, 1,4-butanediol and 1,5-pentanediol. These diols are particularly easy to handle as they are hardly hydrophilic and are liquid at room temperature, and favor a high level of strength with good extensibility over a wide temperature range during the curing of the adhesive. Of these, 1,4-butanediol is most preferred.

Suitable aliphatic polyamines A3 are amines having two or three aliphatic amino groups, in particular commercially available aliphatic, cycloaliphatic or arylaliphatic primary diamines such as in particular ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl -2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, 1,4-diamino-2,2,6-trimethylcyclohexane (TMCDA), 1-amino-3-aminomethyl-3,5,5-trimethyleyclohexane (=isophoronediamine or IPDA), 2- and 4-methyl-1,3-diaminocyclohexane and mixtures thereof, 1,3- and 1,4-bis(aminomethyl)-cyclohexane, 2,5(2,6)-bis(aminomethyl)-bicyclo[2.2.1]heptane (NBDA), 3(4),8(9)-bis(aminomethyl)-tricyclo[5.2.1.0$^{2,6}$]decane, 1,8-menthanediamine, bis(2-aminoethyl)ether, 3,6-dioxaoctane-1,8-diamine, 4,7-dioxadecane-1,10-diamine, 4,7-dioxadecane-2,9-diamine, 1,3-bis(aminomethyl)benzene and 1,4-bis(aminomethyl)benzene.

These diamines result in good phase separation in The cured adhesive, among other things, promoted because they are free of polyoxypropylene chains.

Particularly preferably, polyamine A3 is selected from the group consisting of 1,5-diamino-2-methylpentane, 2,2,4- and 2,4,4-trimethylhexamethylenediamine, 1,8-octanediamine, 1,10-decanediamine, 1-amino-3-aminomethyl-3,5,5-trimethylcyclohexane, 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)bicyclo[2,2,1]heptane, 3(4),8(9) -bis(aminomethyl)tricyclo[5.2.1.0$^{2,6}$]decane, bis(2-aminoethyl) ether, 3,6-dioxaoctane-1,8-diamine, 4,7-dioxadecane-1,10-diamine, 4,7-dioxadecane-2,9-diamine, 1,3-bis(aminomethyl)benzene and 1,4-bis(aminomethyl)benzene.

In the reaction with isocyanates these polyamines lead to urea groups which undergo phase separation particularly well. Adhesives produced therewith have particularly high strength, in particular high moduli of elasticity, and the mechanical properties are only slightly dependent on the temperature.

Of these, 1,3-bis(aminomethyl)cyclohexane and 1,3-bis(aminomethyl)benzene are preferred, with 1,3-bis(aminomethyl)benzene being most preferred. Using these polyamines cured adhesives with particularly high strengths form.

The selection of triol A1, diol A2 and polyamine A3 and their use in specific, carefully matched ratios provides the adhesive with good workability properties and excellent strength, with amorphous and crystalline regions being present with very good separation, and the mechanical properties are only slightly dependent on the temperature.

Ratio V1 of the number of OH groups and NH$_2$, groups of (A2+A3)/A1 is in the range of 4 to 10. In other words, the ratio V1 of (sum of all OH groups of diols A2+sum of all NH$_2$ groups of aliphatic polyamines A3)/(sum of all OH groups of triols A1)=4-10.

Preferably, ratio V1 is 4-9. In the cold, the mechanical properties of such adhesives exhibit particularly low temperature dependence.

Particularly preferably, ratio V1 is 4-8. In the cold, the mechanical properties of such adhesives exhibit particularly low temperature dependence.

Preferably, ratio V1 is 5-10. Such adhesives exhibit particularly high strengths at high temperatures such as 85° C. Particularly preferably, ratio V1 is 6-10. Such adhesives exhibit particularly high strengths at high temperatures such as 85° C.

Preferably, ratio V1 is in the range of 5 to 9, in particular in the range 6 to 8. In the cold, the mechanical properties of such adhesives exhibit particularly low temperature dependence, and at the same time, high strengths at high temperatures such as 85° C.

Ratio V2 of the number of OH groups and NH$_2$ groups of A2/A3 is in the range of 4 to 20. In other words, the ratio of V2 of (the sum of all OH groups of diols A2)/(sum of all NH$_2$ groups of aliphatic polyamines A3)=4-20.

Preferably, ratio V2 is 4-15. Such adhesives exhibit a certain stability with a long open time.

Particularly preferably, ratio V2 is 4-10. Such adhesives exhibit good stability with a readily manageable open time.

Preferably, ratio V2 is 4.5-20. Such adhesives exhibit high strength at high temperatures such as 85° C. and good stability with a short open time.

Particularly preferably, ratio V2 is in the range of 5-20. Such adhesives exhibit high strength at high temperatures such as 85° C. and a good stability at a readily manageable open time.

Preferably, ratio V2 is in the range of 4.5 to 15, in particular in the range of 5 to 10. Such adhesives exhibit a good combination of high strength at high temperatures, good stability during application and well-manageable open time.

Particularly suitable polyisocyanates B1 are monomeric di- or triisocyanates, as well as oligomers, polymers and derivatives of monomeric di- or triisocyanates, as well as any mixtures thereof.

Suitable aromatic monomeric di- or triisocyanates are in particular 2,4- and 2,6-tolylene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl -4,4'-diisocyanatodiphenyl (TODI), dianisidine diisocyanate (DADI), 1,3,5-tris(isocyanatomethyl)benzene, tris(4-isocyanatophenyl)methane, and tris(4-isocyanatophenyl)thiophosphate.

Suitable aliphatic monomeric di- or triisocyanates are in particular 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2.6-diisocyanatocyclohexane and any mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI car $H_{12}$MDI), 1,4-diisocyanato-2,2,6-trimethylcyclohexane (TMCDI), 1,3-, and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di(1-heptenyl)cyclohexene (dimeryl diisocyanate) and α,α,α',α',α'',α'', -hexamethyl-1,3,5-mesitylenetriisocyanat.

In particular, suitable oligomers, polymers, and derivatives of these monomeric diisocyanates and triisocyanates are derived from MDI, TDI, HDI and IPDI. Of these, particularly suitable are commercially available types, especially HDI biurets such as Desmodur® N 100 and N 3200 (from Bayer), Tolonate® HDB and HDB-LV (from Rhodia) and Duranate® 24A-100 (from Asahi Kasei); HDI isocyanurates such as Desmodur® N 3300, N 3600 and N 3790 BA (all from Bayer), Tolonate® HDT, HDT-LV and HDT-LV2 (from Rhodia), Duranate® TPA 100 and THA-100 (from Asahi Kasei) and Coronate® HX (from Nippon Polyurethane); HDI uretdiones such as Desmodur® N 3400 (from Bayer); HDI iminooxadiazindiones such as Desmodur® XP 2410 (from Bayer); HDI allophanates such as Desmodur® VP LS 2102 (from Bayer); IPDI isocyanurates, for example in solution as Desmodur® Z 4470 (from Bayer) or in solid forth as Vestanat® T1890/100 (from Degussa); TDI oligomers such as Desmodur® IL (from Bayer); and mixed isocyanurates based on TDI/HDI, for example as Desmodur® HL (from Bayer). Furthermore, particularly suitable are forms of MDI that are liquid at room temperature (so-called "modified MDI"), which are mixtures of MDI with MDI derivatives, in particular MDI carbodiimides or MDI-uretoneimines or MDI urethanes, known under trade names such as Desmodur® CD, Desmodur® PF, Desmodur® PC (all from Bayer) or Isonate® M 143 (from Dow). and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). In practice, the aforementioned oligomeric polyisocyanates are usually mixtures of substances with different degrees of oligomerization and/or chemical structures. Preferably, they have an average NCO functionality of 2.1 to 4.0.

Preferred polyisocyanates B1 are forms of MDI that are liquid at room temperature. These are in particular so-called polymeric MDI and MDI with fractions of oligomers or derivatives thereof. The content of MDI (=4,4'-, 2,4'- and 2,2'-diphenylmethane diisocyanate and any mixtures of these isomers) of such liquid forms of MDI is in particular 50 to 95% by weight, in particular 60 to 90% by weight.

Particularly preferred polyisocyanates B1 are polymeric MDI and in particular MDI types that are liquid at room temperature, which contain fractions of MDI carbodiimides or their adducts.

Using these polyisocyanates B1 particularly good workability properties and particularly high strengths are obtained.

Polyurethane polymer B2 preferably has 50 to 95% by mass, in particular 70 to 90% by mass, polyoxyalkylene units, particularly preferably polyoxyethylene and/or polyoxypropylene units, in particular polyoxypropylene units. Such a polyurethane polymer has low viscosity and allows for good extensibilities.

Preferably, polyurethane polymer B2 has a mean molecular weight from 1,000 to 20,000 g/mol, particularly preferably from 2,000 to 10,000 g/mol.

Preferably, polyurethane polymer B2 has a mean NCO functionality in the range of 1.7 to 3, in particular 1.8 to 2.5. Such a polyurethane polymer allows for good workability properties and good mechanical properties in the cured state.

Particularly preferably, polyurethane polymer B2 has a mean NCO functionality in the range of 2.05 to 2.5. Such a polyurethane polymer allows for good extensibility at high strength.

Preferably, polyurethane polymer B2 has a free isocyanate group content of 1 to 10% by weight, particularly preferably from 1 to 5% by weight.

Preferably, the urethane groups and the free isocyanate groups of polyurethane polymer B2 are derived from 4,4'-diphenylmethane diisocyanate. Using these, particularly good hard segments and thus particularly high strengths are obtained during curing of the adhesive.

A suitable polyurethane polymer B2 having isocyanate groups is obtainable from the reaction of at least one polyisocyanate with at least one polyol. This reaction may take place in that the polyol and the polyisocyanate are reacted by typical processes, for example at temperatures of 50° C. to 100° C., optionally with the concomitant use of suitable catalysts, wherein the polyisocyanate is metered in such a way that its isocyanate groups are present in stoichiometric excess in relation to the hydroxyl groups of the polyol. Advantageously the polyisocyanate is metered in such a way that an NCO/OH ratio of 1.3 to 5, in particular one of 1.5 to 3, is observed. The "NCO/OH ratio" refers to the ratio of the number of isocyanate groups used to the number of hydroxyl groups used.

Particularly suitable polyols for the preparation of a polyurethane polymer B2 are the following commercially available polyols or mixtures thereof:

Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule having two or more active hydrogen atoms such as water, ammonia or compounds with several OH or NH groups such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline and mixtures of the aforementioned compounds. It is possible to use both polyoxyalkylene polyols having a low degree of unsaturation (measured according to ASTM D-2849-69 and expressed in milliequivalents of unsaturation per gram of polyol (meq/g)), prepared, for example, using so-called double metal cyanide complex catalysts (DMC catalysts), and polyoxyalkylene polyols having a higher degree of unsaturation, prepared, for example, using anionic catalysts such as NaOH, KOH, CsOH or alkali alkoxides.

Polyoxyalkylene diols or polyoxyalkylene triols, in particular polyoxyethylene and polyoxypropylene diols and triols are particularly suitable.

Polyoxyalkylene diols and triols having a degree of unsaturation less than 0.02 meq/g and having a molecular weight in the range of 1,000-30,000 g/mol, and also polyoxypropylene diols and triols having a molecular weight of 400-8,000 g/mol are especially suitable.

So-called ethylene oxide-terminated ("EO endcapped", ethylene oxide -endcapped) polyoxypropylene polyols are specifically suitable.

Styrene-acrylonitrile or acrylonitrile-methyl methacrylate-grafted polyether polyols.

Polyester polyols, also called oligoesterols, prepared by known methods, in particular by polycondensation of hydroxycarboxylic acids or polycondensation of aliphatic and/or aromatic polycarboxylic acids with di- or polyhydric alcohols.

Particularly suitable polyester polyols are those which are produced from divalent to trivalent, in particular divalent alcohols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimerdiol), hydroxypivalic acid neopentyl glycol ester, glycerol, 1,1,1-trimethylolpropane or mixtures of the aforementioned alcohols, and organic di- or tricarboxylic acids, in particular dicarboxylic acids or their anhydrides or esters, such as succinic acid, glutaric acid, adipic acid, trimethyladipic acid, suberic acid, azelaic acid, sebacic acid, dodecane dicarboxylic acid, maleic acid, fumaric acid, dimer fatty acid, phthalic acid, isophthalic acid, terephthalic acid, dimethyl terephthalate, hexahydrophthalic acid, trimellitic acid and trimellitic anhydride, or mixtures of the aforementioned acids, and polyester polyols from lactones such as ε-caprolactone and starters such as the aforementioned di- or trivalent alcohols.

Polyesterdiols are particularly suitable polyester polyols.

Polycarbonate polyols, such as those available, for example, by reacting the aforementioned—used to synthesize the polyesterpolyols—alcohols and dialkyl carbonates, diaryl carbonates or phosgene.

Block copolymers carrying at least two hydroxyl groups and having at least two different blocks with polyether, polyester and/or polycarbonate structure of the type described above, in particular polyether-polyesterpolyols.

Polyacrylate and polymethacrylate polyols.

Polyhydroxy-functional fats and oils, for example natural fats and oils, in particular castor oil; or—so-called oleochemical—polyols obtained by chemical modification of natural fats and oils, for example, epoxypolyesters or epoxypolyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example, by transesterification or dimerization, of the degradation products or derivatives thereof. Suitable degradation products of natural fats and oils are in particular fatty acids and fatty alcohols, and fatty acid esters, in particular, the methyl esters (FAME), which can be derivatized, for example, by hydroformylation and hydrogenation with formation of hydroxy fatty acid esters.

Polyhydrocarbonpolyols, also called oligohydrocarbonols, such as polyhydroxy -functional polyolefins, polyisobutylenes, polyisoprenes; polyhydroxy-functional ethylene -propylene-, ethylene-butylene- or ethylene-propylene-diene copolymers, for example, those made by Kraton Polymers; polyhydroxy-functional polymers from dienes, in particular 1,3-butadiene, which may be prepared in particular also by anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example, polyhydroxy-functional acrylonitrile/butadiene copolymers, for example those that can be produced from epoxides or amino alcohols and carboxyl-terminated acrylonitrile/butadiene copolymers (for example, commercially available under the name Hypro® (formerly Hycar®) CTBN and CTBNX and ETBN from Nanoresins AG, Germany, or Emerald Performance Materials LLC); and hydrogenated polyhydroxy-functional polymers or copolymers of dienes.

Preferred polyols for the preparation of a polyurethane polymer B2 are polyoxyalkylene polyols, polyester polyols, polycarbonate polyols and polyacrylate polyols. Polyoxyalkylene polyols, in particular, polyoxypropylene polyols and mixed polyoxyethylene-polyoxypropylene polyols are particularly preferred.

Preferably, the polyol for the preparation of a polyurethane polymer B2 has a molecular weight from 500 to 20,000 g/mol, in particular 1,000-8,000 g/mol.

Preferably, the polyol for the preparation of a polyurethane polymer B2 is a diol or a mixture of at least one diol and at least one triol, in particular a mixture of at least one diol and at least one triol.

Suitable polyisocyanates for the preparation of a polyurethane polymer B2 are in particular the following commercially available polyisocyanates or mixtures thereof: 2,4- and 2,6-tolylene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), 1,3,5-tris(isocyanatomethyl)benzene, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane, and mixtures of these isomers (HTDI or $H_6TDI$), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}MDI$), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI) and m- and p-tetramethyl-1,3- and -1,4-xylylene diisocyanate (m- and p-TMXDI). MDI, TDI, IPDI, and HDI are preferred. MDI is particularly preferred. 4,4'-diphenylmethane diisocyanate is most preferred. Using this MDI isomer particularly good hard segments and thus particularly high strengths are obtained when curing with diols A2 and polyamines A3.

Preferably, polyisocyanate B1 and the polyisocyanate used to prepare polyurethane prepolymer B2 are different types of polyisocyanate.

Particularly preferably, polyisocyanate B1 is an MDI that is liquid at room temperature and the polyisocyanate used to prepare polyurethane polymer B2 is 4,4'-diphenylmethane diisocyanate, which typically is solid at room temperature. Thus, the second component is liquid at room temperature, which allows tbr easy processing, and particularly good mechanical properties. A defined mixture of polyisocyanate B1 and polyurethane polymer B2 can be achieved in that polyurethane polymer B2 is previously prepared separately before being mixed with polyisocyanate B1.

Thus, preferably, the preparation of polyurethane polymer B2 does not take place in the presence of polyisocyanate B1.

Preferably, the weight ratio of polyisocyanate B1 and polyurethane polymer B2 is 0.25 to 4, preferably 0.25 to 2, particularly preferably 0.3 to 1,5, and in particular 0.4 to 1.0. Such a second component allows for adhesives with good workability, high strength and high elongation.

Additionally, the polyurethane adhesive may contain additional substances that react with isocyanate groups as part of the first component.

In particular, the first component may contain at least one polyol and/or at least one low molecular weight di- or polyhydric alcohol, which has been mentioned for the preparation of polyurethane polymer B2.

Furthermore, the polyurethane adhesive may contain catalysts which accelerate the reaction of hydroxyl groups with isocyanate groups, in particular tin-, zinc- and bismuth-containing organometallic catalysts, for example dibutyltin dilaurate, or tertiary amines, amidines or guanidines, for example, 1,4-diazabicyclo[2.2.2]octane (DABCO) or 1,8-diazabicyclo[5.4.0]undec-7-ene (DBU).

In addition to the aforementioned, the polyurethane adhesive may contain additional components commonly used in two-component polyurethane compositions, in particular the following:
plasticizers;
solvents;
inorganic and organic fillers;
fibers, for example made of polyethylene;
pigments;
rheology modifiers, in particular thickeners or thixotropic agents;
drying agents;
adhesive promoters;
stabilizers against oxidation, heat, light and UV radiation;
flame retardant substances;
surface-active substances, in particular wetting agents, leveling agents, deaerating agents or defoamers;
biocides such as algicides, fungicides or fungal growth inhibitors.

When using additional components of the polyurethane adhesive it is advantageous to make sure that they do not greatly impair the storage stability of the respective components. If such substances should be stored together with isocyanates, this means in particular that they should contain no or at most traces of water. It may be useful to dry certain ingredients chemically or physically before mixing them in.

The components of the polyurethane adhesive are advantageously formulated such that the mixing ratio of the volumes of the first and second components is in the range of 1:3 to 3:1, in particular 1:2 to 2:1. Preferably, this ratio is about 1:1.

Preferably, the mixing ratio is set such that in the mixed polyurethane adhesive, the ratio of the number of isocyanate groups to the number of isocyanate-reactive groups, in particular the sum of OH and $NH_2$ groups, prior to curing is approximately in the range of 1.2 to 1, preferably 1.1 to 1.

The two components are prepared separately from one another and, at least for the second component, typically with the exclusion of moisture. Typically, the components are each stored in a separate container. The other components of the polyurethane adhesive may be present as part of the first or second component, wherein further isocyanate-reactive components preferably are part of the first component. A suitable container for the storage of each component is in particular a drum, a hobbock, a bag, a bucket, a can, a cartridge or a tube.

Prior to the application, the two components are stored separately and mixed with one another only during or immediately prior to the application. Advantageously, the components are in a packaging consisting of two separate chambers.

In a further aspect, the invention comprises a package consisting of packaging having two separate chambers containing one of the two components of the polyurethane adhesive. Preferred packages of this kind are on the one hand side-by-side double cartridges or coaxial cartridges in which two tubular chambers are arranged side by side or one inside the other and are sealed air-tight and moisture-tight by a piston. By advancing these pistons, the components can be pressed out of the cartridge. The sides of the tubes opposite the piston, where appropriate, are modified via an adapter, so that the chamber openings are connected directly to one another in the area of the opening by a partition wall. Advantageously, a thread is mounted in the area of the exit opening of the chambers, so that a static mixer or a dynamic mixer can be mounted tightly. Such packages are particularly preferred for small applications, in particular for charges of up to 1 liter.

For applications in large quantities, especially for applications in industrial production, advantageously, the two components are filled and stored in drums or hobbocks. During application, the components are forced out by means of feed pumps, and metered in via lines of a mixing apparatus, such as those commonly used for two-component adhesives in industrial production.

The mixing is typically done via static mixers or by means of dynamic mixers. When mixing, care must be taken to ensure that the two components are homogeneously mixed insofar as possible. If the two components are poorly mixed, there will be local deviations from the advantageous mixing ratio, which may have implications with respect to a deterioration of the mechanical properties. In order to check the mixing quality visually it may be advantageous if the two components have two different colors. Good mixing is deemed to exist when the mixed adhesive has a homogeneous mixed color without visible streaks or smears.

Upon contact of the first component with isocyanate groups of the second component, curing begins by chemical reaction. Here, the amino groups of the polyamine A3 and the hydroxyl groups of triol A1 and diol A2 and additional isocyanate-reactive substances optionally present react with the isocyanate groups present. Excess isocyanate groups react with moisture present. As a result of these reactions the polyurethane adhesive cures to form a solid material. This process is also referred to as crosslinking.

Another aspect of the present invention relates to a method for bonding a first substrate to a second substrate, comprising the steps of:

mixing of the two components described above,
applying the mixed polyurethane adhesive to at least one of the substrate surfaces to be bonded,
joining the substrates to be bonded within the open time,
curing the polyurethane adhesive.

The two substrates may consist of the same or different materials.

In this method, suitable substrates are in particular
glass, glass ceramics;
metals and alloys, such as aluminum, iron, steel and nonferrous metals and surface-finished metals and alloys such as galvanized or chronic-plated metals;
coated and painted substrates such as powder-coated metals or alloys and painted surfaces;
plastics such as polyvinyl chloride (hard and soft PVC), acrylonitrile-butadiene-styrene copolymers (ABS), polycarbonate (PC), polyamide (PA), polyesters, poly(methylmethacrylate) (PMMA), polyester, epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), where the plastics may be surface-treated preferably by plasma, corona or flame;
fiber-reinforced plastics such as carbon fiber-reintbreed plastics (CFRP), glass fiber- reintbrced plastics (GRP) and sheet molding compounds (SMC);
wood, with resins, such as phenolic, melamine or epoxy resins, bonded wood materials, resin-textile composites and other so-called polymer composites; and
concrete, mortar, brick, tile, gypsum and natural stones such as granite or marble, In this method, one or both substrates is or are preferably a metal or a ceramic or a glass fiber-reinforced plastic or a carbon fiber-reinforced plastic.

If necessary, the substrates may be pretreated before applying the adhesive. Such pretreatments include in particular physical and/or chemical cleaning methods, and applying an adhesive promoter, an adhesive promoter solution or a primer.

From this described method of bonding an article is formed, wherein the adhesive connects two substrates to one another in a force-fitting manner. In particular, this article is a structure, such as a bridge, an industrial item or a consumer item, in particular a window, a rotor blade of a wind turbine or a means of transport, in particular a vehicle, preferably an automobile, a bus, a truck, a train or a boat, as well as an airplane or a helicopter; or an attachment of such an article.

Another object of the invention is an article obtained from the method previously described for bonding.

The polyurethane adhesive described has very good properties as a structural adhesive.

In this case, a structural adhesive refers to an adhesive which forms one portion of the supporting structure of the bonded components in the cured state. Thus, the structural adhesive is an important link of the construction within which it connects two components or substrates. Accordingly, high demands are placed on its mechanical properties.

Preferably, the cured structural adhesive has a tensile strength at room temperature of more than 8 MPa, in particular more than 10 MPa. Preferably, the cured structural adhesive has an elongation at break at room temperature of more than 100%, in particular more than 150%. Preferably, the cured structural adhesive has a modulus of elasticity at room temperature in the range of at least 30 MPa, particularly preferably at least 35 MPa, especially at least 40 MPa, and a modulus of elasticity at 85° C. of at least 20 MPa, preferably at least 25 MPa. Preferably, the values of the modulus of elasticity at −35° C. do not differ too much from the values at 23° C. Particularly preferably, the ratio of the modulus of elasticity at −35° C. and that at 23° C. is at most 5, in particular at most 4.

Preferably, the cured structural adhesive has a tensile shear strength at room temperature of at least 8 MPa, in particular at least 9 MPa, and at 85° C. a tensile shear strength of at least 4 MPa. In this case, these mechanical values mentioned are measured as described in the examples below.

Another important property of a structural adhesive is its good workability. Here, the two components, individually and during mixing, should have a low viscosity so that they are easily conveyed and mixed, but then very quickly build up such a viscosity that immediately a shear-thinning, stable material is obtained, so that layer thicknesses up to 10 mm and more can be applied.

Using the described polyurethane adhesive these requirements are particularly well met.

EXAMPLES

Exemplary embodiments are shown below, which are intended to illustrate the invention described in more detail. Of course, the invention is not limited to the exemplary embodiments described.

1. Substances Used:

| | |
|---|---|
| Polyisocyanate | Modified diphenylmethane diisocyanate, containing MDI carbodiimide, liquid at room temperature, NCO content 28% by weight (Desmodur ® CD from Bayer) |
| Triol | EO-endcapped polyoxypropylene triol, OH number 34.7 mg KOH/g (Voranol ® CP 4755 from Dow) |
| MXDA | 1,3-bis(Aminomethyl)benzene |
| Polyether triamine | Polyoxypropylene triamine, amine number 346.3 mg KOH/g (Jeffamine ® T-403 from Huntsman |

| | |
|---|---|
| DABCO | 1,4-diazabicyclo[2.2.2]octane, 33.0% by weight in dipropylene glycol (DABCO 33 LV ® from Air Products |
| Silica | Fumed silica, hydrophobic modification |

Polymer 1 was prepared by reacting 1300 g of polyoxypropylene diol (Acclaim® 4200 N from Bayer; OH number 28.5 mg KOH/g), 2600 g of polyoxypropylene polyoxyethylene triol (Caradol® MD34-02 from Shell; OH number 35.0 mg KOH/g), 600 g of 4,4'-methylenediphenyl diisocyanate (Desmodur® 44 MC L, from Bayer) and 500 g of diisodecyl phthalate according to a known method at 80° C. to give an NCO-terminated polyurethane polymer having a content of free isocyanate groups of 2.1% by weight.

2. Preparation of Polyurethane Adhesives

For each adhesive, the ingredients specified in Tables 1 and 2 in the amounts indicated (in parts by weight) for the first component ("component 1") were processed to form a homogeneous paste by means of a vacuum dissolver under the exclusion of moisture, and stored, Likewise, the ingredients of the second component ("component 2") specified in Tables 1 and 2 were processed and stored. Then, the two components were processed for 30 seconds to form a homogeneous paste using a SpeedMixer® (DAC 150 FV, Hauschild), and it was tested immediately as follows:

The initial viscosity was measured with a cone-plate rheometer (based on DIN 53019, spindle according to DIN Z3, measured at 25° C., speed 225 rpm, over a period of 60 seconds, Anton Paar Physica Rheolab MC1) 30 seconds after completion of the mixing time. Compositions of ≥100 Pa.s are suitable for use as adhesives, as such compositions can be applied as a bead on a substrate without running or dripping. Compositions with values of ≤100 Pa.s, in particular ≤40 Pa.s, are unsuitable for use as adhesives because they run after application to the substrate.

To determine the mechanical properties, the adhesive was shaped as a dumbbell according to ISO 527, part 2, 1B and was stored or cured for 24 h at 25° C. and then for 3 h at 80° C. After a conditioning time of 24 hours at the temperature (−35° C. or 23° C. or 85° C.) specified in Tables 1 and 2, the modulus of elasticity in the range of 0.05 to 0.25% elongation ("Young's modulus"), the tensile strength and the elongation at break of the specimens thus prepared were measured according to ISO 527 on a Zwick Z020 tensile testing machine at the temperature specified in each ease and a test speed of 50 mm/min. As a measure of the temperature dependency of Young's modulus the ratio of the modulus of elasticity at −35° C. and that at 23° C. is provided, in Tables 1 and 2 called "Young's modulus (−35° C.)/(23° C.)".

For measuring the tensile shear strength 1 minute after completion of the mixing time the adhesive was applied between two KTL-painted steel sheets that were degreased with isopropanol, in a layer thickness of 2.0 mm and on an overlapping adhesive surface area of 15×45 mm and cured for 24 h at 25° C. and then for 3 h at 80° C. After a conditioning time of 24 h at the temperatures specified in Tables 1 and 2, the tensile shear strength was determined at the specified temperature, in each case according to DIN EN 1465. The results are shown in Tables 1 and 2.

Adhesives Z-1 and Z-2 are examples according to the invention; adhesives Ref. 1 to Ref. 8 are comparative examples.

One minute after completion of the mixing time of the two components, adhesive Z-1 was applied to a glass fiber-reinforced plastic plate that was previously degreased with isopropanol and covered with a second identical plate, forming an overlapping adhesive area of 15×45 mm at a layer thickness of 2 mm, cured for 24 h at 23° C. and then for 3 hours at 80° C., and after a conditioning time of 24 h at 23° C., the tensile shear strength was determined as previously described, resulting in a cohesive fracture pattern.

Likewise, two carbon fiber-reinforced plastic plates were bonded with adhesive Z-1 and the tensile shear strength was determined at 23° C. resulting in a cohesive fracture pattern.

Immediately after mixing of the two components, comparative example Ref. 6 was very fluid without stability. Therefore, it was unsuitable as an adhesive, for which reason no mechanical property tests were conducted.

Comparative example Ref. 7 cured so fast that no film for the mechanical tests could be made.

TABLE 1

Composition and properties of Z-1 and Z-2 and Ref.1 to Ref.3 (amounts in parts by weight)

| Compositions | Z-1 | Z-2 | Ref.1 | Ref.2 | Ref.3 |
|---|---|---|---|---|---|
| Component 1 | | | | | |
| Triol | 52.2 | 47.9 | 52.2 | 52.2 | 44.3 |
| 1,4-Butanediol | 7.4 | 9.8 | 7.4 | — | 15.3 |
| 1,2-Ethanediol | — | — | — | 5.9 | — |
| MXDA | 2.0 | 1.0 | — | — | 2.0 |
| Polyether triamine | — | — | 2.0 | 3.0 | 0.2 |
| DABCO | 0.2 | 0.2 | 0.2 | 0.2 | — |
| Calcined kaolin | 33.3 | 36.0 | 33.3 | 33.8 | 33.3 |
| Molecular sieve | 4.9 | 5.3 | 4.9 | 4.9 | 4.9 |
| Component 2 | | | | | |
| Polyisocyanate | 33.2 | 38.7 | 31.2 | 35.9 | 58.1 |
| Polymer 1 | 47.5 | 55.4 | 44.6 | 51.4 | 83.1 |
| Silica | 3.4 | 3.9 | 3.2 | 3.6 | 5.9 |
| Initial viscosity [Pa · s] | ≥100 | ≥100 | ≥100 | ≥100 | ≥100 |
| −35° C.: Tensile strength [MPa] | 34 | 33 | 37 | 32 | 34 |
| Elongation at break [%] | 240 | 140 | 220 | 190 | 134 |
| Young's modulus [MPa] | 198 | 285 | 125 | 125 | 309 |
| Tensile shear strength [MPa] | 13.6 | 13.5 | 13.7 | 13.1 | 12.9 |
| 23° C.: Tensile strength [MPa] | 13 | 14 | 12 | 11 | 15 |
| Elongation at break [%] | 188 | 177 | 184 | 223 | 191 |
| Young's modulus [MPa] | 56 | 59 | 34 | 28 | 91 |
| Tensile shear strength [MPa] | 9.6 | 9.3 | 8.2 | 9.0 | 6.8 |
| 85° C.: Tensile strength [MPa] | 7 | 8 | 7 | 5 | 8 |
| Elongation at break [%] | 105 | 109 | 101 | 108 | 139 |
| Young's modulus [MPa] | 29 | 35 | 23 | 16 | 37 |
| Tensile shear strength [MPa] | 4.4 | 4.6 | 3.8 | 4.1 | 4.6 |
| Young's modulus (−35° C.)/(23° C.) | 3.5 | 4.8 | 3.7 | 4.5 | 3.4 |
| Ratio V1 = (A2 + A3)/A1 | 6.0 | 7.8 | — | — | 13.5 |
| Ratio V2 = A2/A3 | 5.6 | 14.8 | — | — | 11.6 |

TABLE 2

Composition and properties of Ref.4 to Ref.8 (amounts in parts by weight)

| Compositions | Ref.4 | Ref.5 | Ref.6 | Ref.7 | Ref.8 |
|---|---|---|---|---|---|
| Component 1 | | | | | |
| Triol | 55.2 | 52.2 | 54.2 | 52.2 | 52.2 |
| 1,4-Butanediol | 4.4 | 7.4 | 7.4 | 4.9 | |

TABLE 2-continued

Composition and properties of Ref.4 to Ref.8 (amounts in parts by weight)

| Compositions | Ref.4 | Ref.5 | Ref.6 | Ref.7 | Ref.8 |
|---|---|---|---|---|---|
| 2-Ethyl-1,3-hexanediol | — | — | — | — | 7.4 |
| MXDA | 2.0 | 2.0 | — | 4.0 | 2.0 |
| DABCO | 0.2 | 0.2 | 0.2 | 0.2 | 0.2 |
| Calcined kaolin | 33.3 | 33.3 | 33.3 | 33.5 | 33.3 |
| Molecular sieves | 4.9 | 4.9 | 4.9 | 4.9 | 4.9 |
| Component 2 | | | | | |
| Polyisocyanate | 23.7 | 141.1 | 29.2 | 29.6 | 24.5 |
| Polymer 1 | 33.9 | — | 41.8 | 42.4 | 35.0 |
| Silica | 2.4 | 5.9 | 3.0 | 3.0 | 2.5 |
| Initial viscosity [Pa · s] | ≥100 | ≥100 | 20 | ≥100 | ≥100 |
| −35° C.: Tensile strength [MPa] | 36 | 37 | n.d.[1] | n.d.[2] | 40 |
| Elongation at break [%] | 226 | 37 | n.d.[1] | n.d.[2] | 199 |
| Young's modulus [MPa] | 102 | 782 | n.d.[1] | n.d.[2] | 355 |
| Tensile shear strength [MPa] | 13.7 | 12.9 | n.d.[1] | 5.8 | 13.3 |
| 23° C.: Tensile strength [MPa] | 14 | 19 | n.d.[1] | n.d.[2] | 10 |
| Elongation at break [%] | 193 | 110 | n.d.[1] | n.d.[2] | 194 |
| Young's modulus [MPa] | 30 | 166 | n.d.[1] | n.d.[2] | 14 |
| Tensile shear strength [MPa] | 7.4 | 10.0 | n.d.[1] | 4.8 | 6.8 |
| 85° C.: Tensile strength [MPa] | 6 | 11 | n.d.[1] | n.d.[2] | 5 |
| Elongation at break [%] | 87 | 79 | n.d.[1] | n.d.[2] | 81 |
| Young's modulus [MPa] | 17 | 107 | n.d.[1] | n.d.[2] | 11 |
| Tensile shear strength [MPa] | 2.9 | 4.3 | n.d.[1] | 1.0 | 2.3 |
| Young's modulus (−35° C.)/(23° C.) | 3.4 | 4.7 | — | — | 25.4 |
| Ratio V1 = (A2 + A3)/A1 | 3.7 | 6.0 | — | 5.2 | — |
| Ratio V2 = A2/A3 | 3.3 | 5.6 | — | 1.9 | — | n.d.[1] means "not determined", the adhesive was too fluid
n.d.[2] means "not determined", the adhesive was too reactive

The invention claimed is:

1. A polyurethane adhesive comprising a first and a second component, wherein
the first component comprises
   a) et least one triol A1 having a molecular weight in the range of 1,000 to 10,000 g/mol,
   b) at least one diol A2 having two primary hydroxyl groups and a molecular weight in the range of 60 to 150 g/mol, and
   c) at least one aliphatic polyamine A3 with a molecular weight in the range of 60 to 200 g/mol; and
the second component comprises
   d) at least one polyisocyanate B1 and
   e) at least one polyurethane polymer B2 having isocyanate groups, wherein B1 and B2 are not identical;
wherein said triol A1, said diol A2 and said polyamine A3 are present in such an amount that
   f) ratio V1 of the number of OH groups and $NH_2$ groups of (A2+A3)/A1 is in the range of 4:1 to 10:1, and
   g) ratio V2 of the number of OH groups and $NH_2$ groups of A2/A3 is in the range of 4:1 to 20:1.

2. The polyurethane adhesive according to claim 1, wherein the triol is a polyether triol.

3. The polyurethane adhesive according to claim 1, wherein the triol has primary hydroxyl groups.

4. The polyurethane adhesive according to claim 1, wherein the diol is selected from the group consisting of 1,3-propanediol, 1,4-butanediol and 1,5-pentanediol.

5. The polyurethane adhesive according to claims 1, wherein the polyamine is selected from the group consisting of 1,5-diamino-2-methylpentane, 2,2,4- and 2,4,4-trimethylhexamethylenediamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis(aminomethyl)-cyclohexane, 1,4-bis(aminomethyl)-cyclohexane, 2,5(2,6)-bis(aminomethyl)bicyclo[2,2,1]heptane, 3(4),8(9)-bis(aminomethyl)tricyclo[$5.2.1.0^{2.6}$]decane, bis(2-aminoethyl)ether, 3,6-dioxaoctane -1,8-diamine, 4,7-dioxadecane-1,10-diamine, 4,7-dioxedecane-2,9-diamine, 4,9-dioxadodecane-1,12-diamine, 5,8-dioxadodecane-3,10-diamine, 1,3-bis(aminomethyl)benzene and 1,4-bis(aminomethyl)benzene.

6. The polyurethane adhesive according to claim 1, wherein the ratio V1 is in the range of 5:1 to 9:1.

7. The polyurethane adhesive according to claim 1, wherein the ratio V2 is in the range of 4.5:1 to 15:1.

8. The polyurethane adhesive according to claim 1, wherein the polyisocyanate B1 comprises a diphenylmethane diisocyanate (MDI) in the form of a 4,4'-MDI, a 2,4'-MDI, a 2,2'-MDI, or a mixture thereof.

9. The polyurethane adhesive according to claim 8, wherein the polyisocyanate B1 comprises 50% to 95% by weight of MDI based on the weight of polyisocyanate B1.

10. The polyurethane adhesive according to claim 8, wherein the polyisocyanate B1 comprises 60% to 90% by weight of MDI based on the weight of polyisocyanate B1.

11. The polyurethane adhesive according to claim 1, wherein the polyurethane polymer B2 has 50% to 95% by mass polyoxyalkylene units.

12. The polyurethane adhesive according to claim 1, wherein the urethane groups and the free isocyanate groups of the polyurethane polymer B2 are derived from 4,4'-diphenylmethane diisocyanate.

13. A method for bonding a first substrate to a second substrate, the method comprising the steps of:
   mixing of the two components of a polyurethane adhesive according to claim 1;
   applying the mixed polyurethane adhesive to at least one of the substrate surfaces to be bonded:
   joining the substrates to be bonded within the open time; and
   curing the polyurethane adhesive.

14. The method according to claim 13, wherein the preparation of the polyurethane polymer B2 does not take place in the presence of polyisocyanate B1.

15. The method according to claim 13, wherein one or both substrates is or are a metal or a ceramic or a glass fiber-reinforced plastic or a carbon fiber-reinforced plastic.

16. An article obtained from a method of bonding according to claim 13.

* * * * *

UNITED STATES PATENT AND TRADEMARK OFFICE
CERTIFICATE OF CORRECTION

PATENT NO. : 10,059,863 B2
APPLICATION NO. : 14/413371
DATED : August 28, 2018
INVENTOR(S) : Wolfgang Roock et al.

Page 1 of 1

It is certified that error appears in the above-identified patent and that said Letters Patent is hereby corrected as shown below:

On the Title Page

(73) Assignee should read: SIKA TECHNOLOGY AG, Baar (CH)

Signed and Sealed this
Twenty-fourth Day of September, 2019

Andrei Iancu
*Director of the United States Patent and Trademark Office*